Patented Nov. 11, 1952

2,617,831

UNITED STATES PATENT OFFICE 2,617,831

1,3,5-TRIS(α-HYDROXYETHYL)BENZENE

David T. Mowry, Dayton, Ohio, assignor to Monsanto Chemical Company, St. Louis, Mo., a corporation of Delaware No Drawing. Application June 30, 1948,
Serial No. 36,261

1 Claim. (Cl. 260—618)

This invention relates to a new chemical compound useful as an intermediate in the preparation of polymerizable vinyl compounds, and to a method for its preparation. More specifically the invention relates to a tricarbinol which can readily be dehydrated to form a trivinyl derivative.

The primary purpose of this invention is to provide a new and useful organic compound, tris-(α-hydroxyethyl)benzene. In copending application, Serial No. 36,282, filed June 30, 1948, by David T. Mowry, now Patent No. 2,591,587, issued April 1, 1952, there are described and claimed a method of converting this compound into trivinylbenzene and the chemical composition, trivinylbenzene. The new trihydric alcohol is also useful for the preparation of alkyd resins by reaction with polyfunctional acids or their anhydrides.

The new chemical compound, 1,3,5-tris(α-hydroxyethyl)benzene is prepared by refluxing acetone and methyl formate in the presence of sodium methylate in an anhydrous ether solution, condensing the product to form 1,3,5-triacetylbenzene, and then reducing the 1,3,5-triacetylbenzene. The reduction is conducted preferably with hydrogen under pressure and in the presence of a suitable hydrogenation catalyst. Useful hydrogenation catalysts are nickel, cobalt, iron, copper, and copper chromite, preferably in finely divided form. The reaction will usually require heating at temperatures which will depend upon the activity of the catalyst used, and will generally be between 50° C. and 200° C. The catalytic hydrogenation may be carried out either in the presence or absence of a solvent. Any suitable hydrogenation solvent may be used, for example ethanol, methanol, benzene, and dioxane. The reduction may also be conducted by the action of agents other than hydrogen, for example sodium and ethanol, aluminum isopropoxide in the presence of isopropanol, or lithium aluminum hydride in the presence of ether. The 1,3,5-tris(α-hydroxyethyl)benzene may be obtained directly in crystalline form, or by evaporation of the solvent if used in the synthesis. The new compound may be purified by re-crystallization from aqueous dioxane or aqueous alcohol solutions.

The new chemical compound is primarily useful as an intermediate in the preparation of trivinylbenzene but it may also be converted to other useful compositions.

Further details of the preparation of the new composition are set forth with respect to the following examples.

Example 1

In a 3-necked, 5-liter flask equipped with a mechanical stirrer, reflux condenser and additive funnel was placed 162 grams of dry sodium methylate and three pounds of dry ether. To the stirred slurry was added a solution of 174 grams of dry acetone in 198 grams of methyl formate at a rate so that the ether refluxed slowly. After addition was complete, the slurry was stirred and refluxed for three hours. The sodium salt of formyl acetone was then filtered from the ether solution, dissolved in one liter of water and 200 cc. of glacial acetic acid was added. The precipitate of 1,3,5-triacetylbenzene which formed in a few hours was filtered and dried. The mother liquor was then heated to 50° C. for eighteen hours and cooled to give a second crop of product. The two crops of dry 1,3,5-triacetylbenzene, M. P. 160–162° C., which were obtained weighed 95 grams and represented a 46.5 percent yield.

One hundred twenty parts by weight of 1,3,5-triacetylbenzene prepared in the above manner, 150 parts of absolute ethanol and 7 parts of copper-chromite hydrogenation catalyst were charged to an autoclave. Hydrogen was then pumped into the autoclave to an initial pressure of 3000 pounds per square inch gauge and the autoclave was heated with agitation by rocking to 125° C. After fifteen minutes the reaction was complete as evidenced by the rate of decrease in hydrogen pressure. The autoclave was cooled, opened and the contents filtered to remove the catalyst. The ethanol solution was then evaporated to give solid crystalline 1,3,5 - tris(α-hydroxyethyl)benzene, M. P. 124–131° C., in nearly quantitative yield. A small sample which was re-crystallized from dioxane melted at 137°.

Example 2

The procedure of Example 1, was repeated except that an initial hydrogen pressure of 600 pounds gauge was used at a temperature of 110° C. to 120° C. A nearly quantitative yield was obtained in three hours.

Although the invention has been described with respect to specific embodiments, it is not intended that the details thereof shall be construed as limitations upon the scope of the invention except to the extent incorporated in the following claim.

I claim:

1,3,5-tris(α-hydroxyethyl)benzene.

DAVID T. MOWRY.

REFERENCES CITED

The following references are of record in the file of this patent:

UNITED STATES PATENTS

| Number | Name | Date |
|---|---|---|
| 1,247,629 | Brochet | Nov. 17, 1917 |
| 2,334,100 | Ipatieff et al. | Nov. 9, 1943 |
| 2,400,959 | Stewart | May 28, 1946 |

OTHER REFERENCES

Claisen et al, Berichte, vol. 21 (1888), pp. 1144–49, 6 pages. (Page 1145 only is pertinent to the claim.)